(12) United States Patent
Zhong et al.

(10) Patent No.: US 12,417,134 B2
(45) Date of Patent: Sep. 16, 2025

(54) LIFE CYCLE MANAGEMENT OF RUN TIME SERVICES IN EDGE COMPUTING ENVIRONMENT

(71) Applicant: Dell Products L.P., Round Rock, TX (US)

(72) Inventors: Haijun Zhong, Shanghai (CN); Xiaoye Jiang, Wayland, MA (US); XiaoJun Wu, Shanghai (CN); Muzhar S. Khokhar, Shrewsbury, MA (US)

(73) Assignee: Dell Products L.P., Round Rock, TX (US)

( * ) Notice: Subject to any disclaimer, the term of this patent is extended or adjusted under 35 U.S.C. 154(b) by 676 days.

(21) Appl. No.: 17/586,793

(22) Filed: Jan. 28, 2022

(65) Prior Publication Data

US 2023/0244558 A1  Aug. 3, 2023

(51) Int. Cl.
*G06F 9/54* (2006.01)
(52) U.S. Cl.
CPC .................................... *G06F 9/547* (2013.01)
(58) Field of Classification Search
CPC ... G06F 8/60; G06F 8/61; G06F 9/547; G06F 9/5044; G06F 9/5055
See application file for complete search history.

(56) References Cited

U.S. PATENT DOCUMENTS

| 2018/0113790 | A1* | 4/2018 | Chunduri | G06F 11/3664 |
| 2018/0307514 | A1* | 10/2018 | Koutyrine | G06F 11/0706 |
| 2019/0320038 | A1* | 10/2019 | Walsh | H04L 67/10 |
| 2020/0233403 | A1* | 7/2020 | Gelbke | G06F 8/60 |
| 2020/0322225 | A1* | 10/2020 | Alamouti | G06F 9/5072 |
| 2022/0225065 | A1* | 7/2022 | Doken | H04L 41/5051 |
| 2023/0063629 | A1* | 3/2023 | Chandhoke | G06F 11/273 |

* cited by examiner

*Primary Examiner* — Brian W Wathen
(74) *Attorney, Agent, or Firm* — Jackson Walker L.L.P.

(57) ABSTRACT

A microservice management method responds to receiving a function request, comprising a request for a particular function, by collecting function metadata for the particular function and sending the function request and the function metadata to a cloud side orchestrator. The function metadata include one or more prerequisite for an execution environment. Suitable microservices for the particular function are identified, in accordance with the function metadata. The identified microservices are sent to an edge side orchestrator that installs, initializes, and monitors these microservices and, responsive to detecting complete execution of the particular function, terminates one or more of the suitable microservices. The identification of suitable microservices may be based, at least in part, on one or more preference factors including a dependency factor, indicative of a historical dependency between the particular function and one or more microservices and a relevance factor indicative of whether a microservice edge-type microservice.

12 Claims, 3 Drawing Sheets

|  | api_1 | api_2 | ... | api_n |
|---|---|---|---|---|
| edge_1 | ms_1 | ... | ... | ms_n |
| edge_2 | ms_2 | ... | ... | ms_n |
| ... | ... | ... | ... | ... |
| edge_n | ms_1 | ... | ... | ms_n |

|  | api_1 | api_2 | ... | api_n |
|---|---|---|---|---|
| ms1 | {edge_1,edge2} | {edge_1,edgen} | ... | No |
| ms2 | No | {edge_1,edge3} | ... | No |
| ... | ... | ... | ... | ... |
| ms_n | No |  | ... | {edge_1,edgen} | ary, management of services
LIFE CYCLE MANAGEMENT OF RUN TIME SERVICES IN EDGE COMPUTING ENVIRONMENT

TECHNICAL FIELD

The present disclosure relates to cloud platform management and, more particular, management of services deployed in edge computing environments.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, including the VxRail family of hyper-converged infrastructure appliances from Dell Technologies, enable edge computing that delivers highly responsive cloud services for scalability and privacy-policy enforcement for the Internet of Things, and the ability to mask transient cloud outages.

Conventional microservice management approaches typically suffer from long release cycles of static, monolithic application packages and may require rush release cycles for quality or security package releases.

SUMMARY

In accordance with disclosed teachings, a microservice management method and system respond to receiving a function request, comprising a request to provide a particular function, by collecting function metadata for the particular function and sending the function request and the function metadata to a cloud side orchestrator. The function metadata may include one or more prerequisite for an execution environment. Suitable microservices for the particular function are identified, in accordance with the function metadata. The identified suitable microservices are sent to an edge side orchestrator. The edge side orchestrator installs, initializes, and monitors these microservices and, responsive to detecting complete execution of the particular function, terminates one or more of the suitable microservices.

The identification of suitable microservices may be based, at least in part, on one or more preference factors wherein the preference factors include a dependency factor, indicative of a historical dependency between the particular function and one or more microservices and a relevance factor indicative of whether a microservice is an edge-type microservice. For purposes of this disclosure, an edge-type microservice refers to a microservice that is primarily invoked in edge environments, to address and prevent situations in which a bundle of microservices associated with a function, including microservices rarely if ever invoked on the edge are nevertheless installed on the edge side.

One or more of the previously referenced preference factors may be influenced an API definition of the particular function, edge side metadata for a particular microservice, and/or microservice metadata. The edge side metadata may include hardware related metadata indicative of hardware versions and firmware versions that impact the particular microservice and service related metadata indicative of microservice versions that impact microservice calling dependencies and inter-service compliance. The microservice metadata for a particular microservice may include an API identifier indicating the API employing the particular microservice, hardware and software dependencies impacting the particular microservice, and a persistence parameter indicating persistence requirements of the particular microservice.

Disclosed microservice management methods may further include determining, based at least in part on the API definition, the edge side metadata, and the microservice metadata, a consolidated view wherein the consolidated view indicates the suitable microservices for a particular function.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
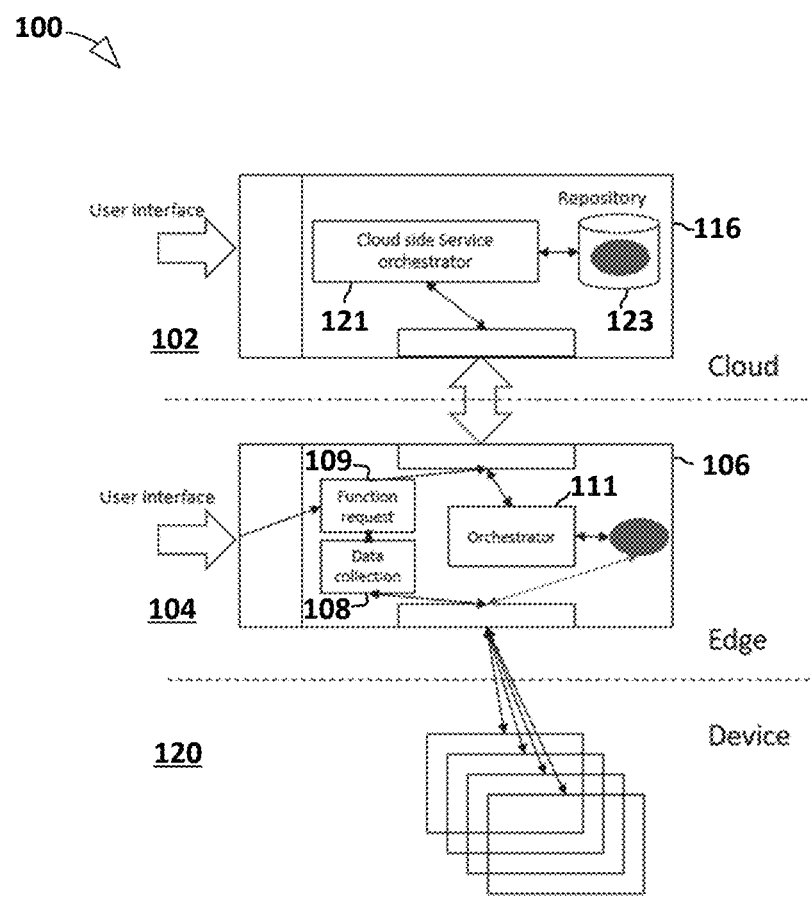
FIG. 1 illustrates an exemplary edge computing environment in accordance with disclosed teachings for active management of run time services.

Exemplary embodiments and their advantages are best understood by reference to FIGS. 1-4, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates a cloud computing platform 100 in accordance with disclosed teachings for managing microservices. The cloud platform 100 illustrated in FIG. 1 includes cloud side resources 102, also sometimes referred to herein simply as cloud 120, edge resources 104, sometimes referred to herein simply as edge side 104, and device or IoT resources 120. IoT devices 120 may generate and provide raw data to edge side 104, where the raw data may be validated, formatted, and otherwise processed before being uploaded to the cloud 102 for analysis.

Applications and functions may be deployed within edge resources 104 in accordance with a microservice architecture wherein any given application is deployed as a group of one or more compact function-specific microservices as will be readily understood by those of ordinary skill in the field of edge computing. Conventional microservice management may spin up a monolithic package of microservices each time the applicable function call is made. Microservice management features disclosed hearing, however, actively monitor and manage microservice deployment in the edge resources 104.

As depicted in FIG. 1, edge resources 104 include a edge side life cycle management resource 106 while cloud side resources 102 include a cloud-based life cycle management resource 116. Edge side management resource 106, as depicted in FIG. 1, includes a function request module 108, a data collection module 109, and an orchestrator 111. The cloud-based management resource 116 illustrated in FIG. 1 includes a cloud side service orchestrator 121 shown coupled to a repository 123.

Figure 2:
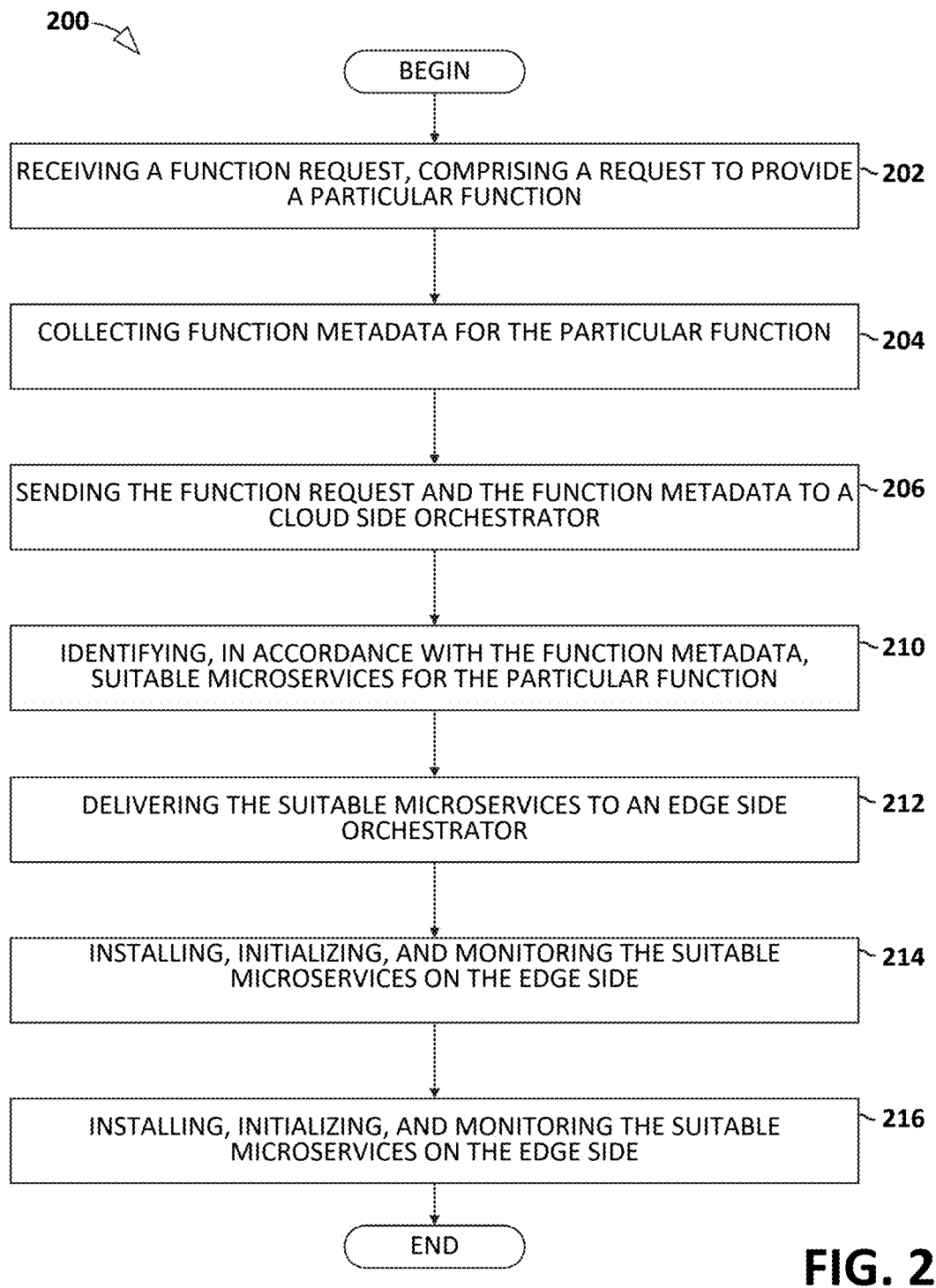
FIG. 2 illustrates a flow diagram of a microservices management method in accordance with disclosed teachings.

As described in with respect to FIG. 2, a user or a program may generate a request for a particular function, which may be accepted by function request service 109. Function request service 109 may then generate a data collection request 108 to collect data necessary for function call. This collected data may have been collected in advance and saved in edge storage (not depicted in FIG. 1). The function request may then be sent to cloud side 102 with the collected data.

The cloud side orchestrator 121 may accept the data and identify one or more suitable microservices to deploy in edge side 104 to implement or support the requested function. Cloud side orchestrator 121 may identify suitable microservices to deploy based on factors including but not necessarily limited to a dependency factor indicative of microservices that correlate strongly with the particular function. The cloud side orchestrator may also consider a factor, referred to herein as a relevance factor, indicative of whether a microservice might be inappropriate for edge side resources because, as an example, the microservice is rarely if ever invoked in an edge environment. In a conventional, monolithic package deployment of microservices for a requested function, deployed services may include services that are primarily only executed or invoked in the cloud 102.

After identifying suitable microservices for a particular requested function, cloud side orchestrator 121 may deliver the identified microservices to edge side 104. Edge side orchestrator 111 may then install, initialize, and monitor the microservices identified by cloud side service orchestrator 121. As part of its monitoring of the suitable microservices provided from the cloud, edge side orchestrator 111 may monitor or otherwise detect the satisfactory and complete execution of the requested function and, in response, edge side orchestrator 111 may terminate one or more of the deployed microservices.

As described with respect to FIG. 1, each of the suitable microservices deployed to edge side 104 experiences a lifecycle that may be characterized as having four distinct stages, in a first stage, the microservice is generated with metadata that may include, for example, pre-conditions regarding the execution environment suitable for the service. The microservice may then be identified as a microservice for the requested function and sent to edge side 104. In this step, the service experiences a change in status from an in-cloud service image or code to an executable instance on the edge 104. Next, the microservice may be initialized and executed on an edge side node (not depicted in FIG. 1). The edge side orchestrator may manage the start, status checks, and removal of the service. After the particular function completes execution, the service may be removed in response to a directive form the cloud side orchestrator, or, in at least some cases, based upon a request from the service itself to be eliminated.

The cloud side orchestrator 121 may identify suitable services for deployment to the edge side in response to a request based on numerous factors, some of which are described herein. In at least some embodiments, the orchestration mechanism is influenced by a definition of an API associated with the requested function, edge side metadata, and microservice metadata. The API definition reflects an interface and contract between multiple services. Edge side metadata may include hardware related metadata and service related metadata. In this context, hardware related metadata may include or indicate hardware and/or firmware versions that impact specific services running on edge side 104. Service related data may refer to data indicating microservice versions that impact, for example, service calling dependencies and inter-service compliance issues. In some embodiments microservice metadata includes an indicator of the API that employs a particular microservice, hardware and software dependencies that impact a particular microservice, and a persistence parameter instructing the inside orchestrator on how to persist or not persist the service. Examples of persistence parameter values include persist in the edge side, remove after execution, or even a value indicating how long the service should be persisted in the edge environment 104.

Because there are numerous parameters impacting the cloud side orchestration in the selection of suitable microservices, it may be useful to set forth definitions for at least some of these parameters. For example, inside metadata may be defined as a tuple or pair that includes hardware metadata and the service metadata. The microservice metadata definition may be defined to include an API indicator, edge metadata, and the persistence parameter.

Figures 3, 4:
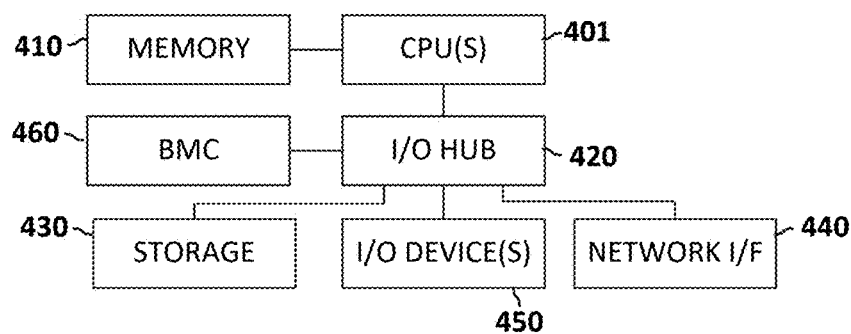
FIG. 3 illustrates a view of edge and API dependencies.
FIG. 4 illustrates an exemplary information handling system suitable for use in providing or performing elements depicted in FIG. 1 through FIG. 3.

Consolidating all microservice definitions may generate a view of API and edge side metadata and this may readily convey microservices suitable for any particular combination of edge and API. Referring to FIG. 3, a view 300 of API and edge side metadata is illustrated in which the suitable microservices are visible by inspection with respect to various APIs and edge environments. In this view, the different edge environments may refer to edge environment with different configurations including, for example, different versions of software or hardware.

Referring now to FIG. 2, a flow diagram depicts a services management method 200. The illustrated method 200 includes receiving (block 202), from a user or program, a function request, comprising a request to provide a particular function. In response to receiving the function call, function metadata is collected (block 204) for the particular function. The function request and the function metadata may then be sent (block 206) to a cloud side orchestrator. The illustrated method may then identify (block 210), in accordance with the function metadata, suitable microservices for the particular function and deliver (block 212) the suitable microservices to an edge side orchestrator. The edge orchestrator may then install, initialize, and monitor (block 214) the suitable microservices on the edge side. Responsive to detecting complete execution of the function, one or more of the microservices may be terminated (block 220).

Referring now to FIG. 4, any one or more of the elements illustrated in FIG. 1 through FIG. 3 may be implemented as or within an information handling system exemplified by the information handling system 400 illustrated in FIG. 4. The illustrated information handling system includes one or more general purpose processors or central processing units (CPUs) 401 communicatively coupled to a memory resource 410 and to an input/output hub 420 to which various I/O resources and/or components are communicatively coupled. The I/O resources explicitly depicted in FIG. 4 include a network interface 440, commonly referred to as a NIC (network interface card), storage resources 430, and additional I/O devices, components, or resources 450 including as non-limiting examples, keyboards, mice, displays, printers, speakers, microphones, etc. The illustrated information handling system 400 includes a baseboard management controller (BMC) 460 providing, among other features and services, an out-of-band management resource which may be coupled to a management server (not depicted). In at least some embodiments, BMC 460 may manage information handling system 400 even when information handling system 400 is powered off or powered to a standby state. BMC 460 may include a processor, memory, an out-of-band network interface separate from and physically isolated from an in-band network interface of information handling system 400, and/or other embedded information handling resources. In certain embodiments, BMC 460 may include or may be an integral part of a remote access controller (e.g., a Dell Remote Access Controller or Integrated Dell Remote Access Controller) or a chassis management controller.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A microservices management method, wherein the method comprises:
    responsive to receiving a function request, comprising a request to provide a particular function, collecting function metadata for the particular function;
    sending the function request and the function metadata to a cloud side orchestrator;
    identifying, in accordance with the function metadata, suitable microservices for the particular function based, at least in part, on at least one preference factor selected from:
        a dependency factor indicative of a historical dependency between the particular function and a microservice; and
        a relevance factor indicative of whether a microservice is an edge-type microservice, wherein an edge-type microservice is primarily invoked in an edge environment;
    sending the suitable microservices to the edge side;
    installing, initializing, and monitoring the suitable microservices on the edge side; and
    responsive to detecting complete execution of the function, terminating one or more of the suitable microservices.

2. The microservices management method of claim 1, wherein the function metadata includes one or more prerequisite for an execution environment.

3. The microservices management method of claim 1, wherein at least one the preference factors is influenced by one or more of:
    an API definition of the particular function;
    edge side metadata for a particular microservice wherein the edge side metadata includes:
        hardware related metadata indicative of hardware versions and firmware versions that impact the particular microservice; and
        service related metadata indicative of microservice versions that impact at least one of:
        microservice calling dependencies and inter-service compliance; and
        microservice metadata wherein the microservice metadata for a particular microservice includes:
            an API identifier indicative of an API employing the particular microservice;
            hardware and software dependencies impacting the particular microservice; and
            a persistence parameter indicating persistence requirements of the particular microservice.

4. The microservices management method of claim 3, further comprising:
    determining, based on the API definition, the edge side metadata, and the microservice metadata, a consolidated view wherein the consolidated view indicates the suitable microservices for a particular function.

5. An information handling system, comprising:
    a central processing unit (CPU); and
    a computer readable memory, accessible to the CPU, including processor executable instructions that, when executed by the CPU, cause the processor to perform operations for managing microservices, wherein the operations include:
        responsive to receiving a function request, comprising a request to provide a particular function, collecting function metadata for the particular function;
        sending the function request and the function metadata to a cloud side orchestrator;
        identifying, in accordance with the function metadata, suitable microservices for the particular function based, at least in part, on at least one preference factor selected from:
            a dependency factor indicative of a historical dependency between the particular function and a microservice; and
            a relevance factor indicative of whether a microservice is an edge-type microservice, wherein an edge-type microservice is primarily invoked in an edge environment;
        sending the suitable microservices to the edge side;
        installing, initializing, and monitoring the suitable microservices on the edge side; and
        responsive to detecting complete execution of the function, terminating one or more of the suitable microservices.

6. The information handling system of claim 5, wherein the function metadata includes one or more prerequisite for an execution environment.

7. The information handling system of claim 5, wherein at least one the preference factors is influenced by one or more of:
    an API definition of the particular function;
    edge side metadata for a particular microservice wherein the edge side metadata includes:
        hardware related metadata indicative of hardware versions and firmware versions that impact the particular microservice; and
        service related metadata indicative of microservice versions that impact at least one of:
        microservice calling dependencies and inter-service compliance; and
        microservice metadata wherein the microservice metadata for a particular microservice includes:
            an API identifier indicative of an API employing the particular microservice;
            hardware and software dependencies impacting the particular microservice; and
            a persistence parameter indicating persistence requirements of the particular microservice.

8. The information handling system of claim 7, further comprising:
    determining, based on the API definition, the edge side metadata, and the microservice metadata, a consolidated view wherein the consolidated view indicates the suitable microservices for a particular function.

9. A non-transitory computer readable medium including process executable instructions that, when executed by a processor, cause the processor to perform operations, wherein the operations comprise:

responsive to receiving a function request, comprising a request to provide a particular function, collecting function metadata for the particular function;

sending the function request and the function metadata to a cloud side orchestrator;

identifying, in accordance with the function metadata, suitable microservices for the particular function based, at least in part, on at least one preference factor selected from:

a dependency factor indicative of a historical dependency between the particular function and a microservice; and a relevance factor indicative of whether a microservice is an edge-type microservice, wherein an edge-type microservice is primarily invoked in an edge environment;

sending the suitable microservices to the edge side;

installing, initializing, and monitoring the suitable microservices on the edge side; and responsive to detecting complete execution of the function, terminating one or more of the suitable microservices.

10. The non-transitory computer readable medium of claim 9, wherein the function metadata includes one or more prerequisite for an execution environment.

11. The non-transitory computer readable medium of claim 9, wherein at least one the preference factors is influenced by one or more of:

an API definition of the particular function;

edge side metadata for a particular microservice wherein the edge side metadata includes:

hardware related metadata indicative of hardware versions and firmware versions that impact the particular microservice; and service related metadata indicative of microservice versions that impact at least one of:

microservice calling dependencies and inter-service compliance; and microservice metadata wherein the microservice metadata for a particular microservice includes:

an API identifier indicative of an API employing the particular microservice;

hardware and software dependencies impacting the particular microservice; and a persistence parameter indicating persistence requirements of the particular microservice.

12. The non-transitory computer readable medium of claim 11, further comprising:

determining, based on the API definition, the edge side metadata, and the microservice metadata, a consolidated view wherein the consolidated view indicates the suitable microservices for a particular function.

* * * * *